(12) United States Patent
Capps

(10) Patent No.: US 6,311,425 B1
(45) Date of Patent: Nov. 6, 2001

(54) FLYING WATERFOWL DECOY SYSTEM

(75) Inventor: Ronnie Edward Capps, Dyersburg, TN (US)

(73) Assignee: Reelfoot Outdoor Company, LLC, Jackson, TN (US)

( * ) Notice: Subject to any disclaimer, the term of this patent is extended or adjusted under 35 U.S.C. 154(b) by 0 days.

(21) Appl. No.: 09/677,579

(22) Filed: Oct. 2, 2000

Related U.S. Application Data

(63) Continuation of application No. 09/400,142, filed on Sep. 21, 1999, now abandoned.

(51) Int. Cl.[7] .................................................. A01M 31/06
(52) U.S. Cl. ................................................................ 43/3
(58) Field of Search ............................ 43/2, 3; 446/228, 446/229

(56) References Cited

U.S. PATENT DOCUMENTS

| | | |
|---|---|---|
| 2,028,849 | 1/1936 | Shay . |
| 2,129,781 | 9/1938 | Park . |
| 2,174,211 | 9/1939 | Hutaff, Jr. . |
| 3,016,647 * | 1/1962 | Peterson et al. ............................ 43/3 |
| 3,405,478 | 10/1968 | Richter . |
| 3,864,868 | 2/1975 | Wolf . |
| 5,003,722 | 4/1991 | Berkley et al. . |
| 5,832,649 | 11/1998 | Kilgore . |
| 6,044,581 * | 4/2000 | Shipman et al. ............................ 43/3 |
| 6,079,140 * | 6/2000 | Brock ............................................ 43/3 |
| 6,138,396 * | 10/2000 | Capps ............................................ 43/3 |

* cited by examiner

Primary Examiner—Charles T. Jordan
Assistant Examiner—Francis T. Palo
(74) Attorney, Agent, or Firm—Luedeka, Neely & Graham, P.C.

(57) ABSTRACT

An apparatus for simulating a waterfowl in flight includes a pulley disposed at a first position well above the surface of a body of water, and a motor disposed at a second position near the surface of the water, where the two positions are horizontally separated by about 50–200 yards. The motor includes a drive shaft operable to rotate in response to torque produced by the motor. A capstan is attached to the drive shaft of the motor for rotating in response to the rotation of the drive shaft. The apparatus includes a loop of flexible line formed into an oval having first and second ends. The first end of the oval is looped over the pulley and the second end is looped over the capstan, such that the loop is held in tension between the pulley and the capstan. Attached to the flexible line is a waterfowl decoy made of buoyant material shaped to resemble a type of waterfowl in flight. As the loop rotates in response to the rotation of the motor drive shaft, the decoy descends from the first position to the second position, thus simulating a waterfowl descending to and lighting upon the surface of the water. The apparatus includes a remote motor controller for controlling operation of the motor from a remote location, such as from a duck blind.

8 Claims, 4 Drawing Sheets

FLYING WATERFOWL DECOY SYSTEM

This application is a continuation of patent application Ser. No. 09/400,142, filed Sep. 21, 1999, now abandoned, entitled FLYING WATERFOWL DECOY SYSTEM.

TECHNICAL FIELD

The present invention is generally directed to waterfowl decoys. More particularly, the invention is directed to a system for simulating a flying waterfowl.

BACKGROUND AND SUMMARY OF THE INVENTION

One of the greatest challenges in waterfowl hunting is attracting waterfowl to within gunshot range of the hunter. To attract waterfowl, hunters typically place a spread of floating decoys on the surface of a body of water adjacent to the hunters' blind. Waterfowl flying over a spread of decoys are often hesitant about lighting on the water, especially if the fowl see anything in or near the water that appears out of the ordinary. In many instances, "undecided" fowl become less hesitant to set down if they see one of their own, or at least what they perceive to be one of their own, set down in the water first. There is currently no known waterfowl decoy system that simulates a waterfowl flying in and setting down on the surface of the water.

The foregoing and other needs are met by an apparatus for simulating a waterfowl in flight. The apparatus includes a pulley disposed at a first position having a first elevation relative to a surface of a body of water. A motor is disposed at a second position having a second elevation relative to the surface of the body of water, where the first and second positions are horizontally spaced apart by a separation distance. The motor includes a drive shaft operable to rotate in response to torque produced by the motor. A capstan is attached to the drive shaft of the motor for rotating in response to the rotation of the drive shaft. The apparatus includes a loop of flexible line formed into an oval having first and second ends. The first end of the oval is looped over the pulley and the second and is looped over the capstan, such that the loop is held in tension between the pulley and the capstan. Attached to the flexible line is a waterfowl decoy made of buoyant material shaped to resemble a type of waterfowl. The apparatus includes a motor controller disposed remotely from the motor for controlling operation of the motor from a remote location.

In another aspect, the invention provides a method for simulating a waterfowl in flight. The method includes providing first and second rotational support structures disposed at first and second positions having first and second elevations, respectively, relative to a surface of a body of water, where the first and second positions are horizontally spaced apart by a separation distance. A loop of flexible line is supported in tension between the first and second positions by looping the line about the first and second rotational support structures, and a waterfowl decoy is attached to the flexible line. The method includes applying a first tangential pulling force to the loop to cause the loop to rotate about the rotational support structures in a first tangential direction until the waterfowl decoy is positioned adjacent the first position. A second tangential pulling force is then applied to the loop to cause the loop to rotate about the rotational support structures in a second tangential direction to move the waterfowl decoy from adjacent the first position to adjacent the second position.

In preferred embodiments, the first position is elevated high above the surface of the water, the second position is near the surface of the water, and the two positions are horizontally separated by about 50–200 yards Thus, as the loop rotates in the second tangential direction, the descent of the decoy from the first to the second position simulates a waterfowl descending to and lighting upon the surface of the water.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows.

DETAILED DESCRIPTION OF THE PREFERRED EMBODIMENT

Figure 1:
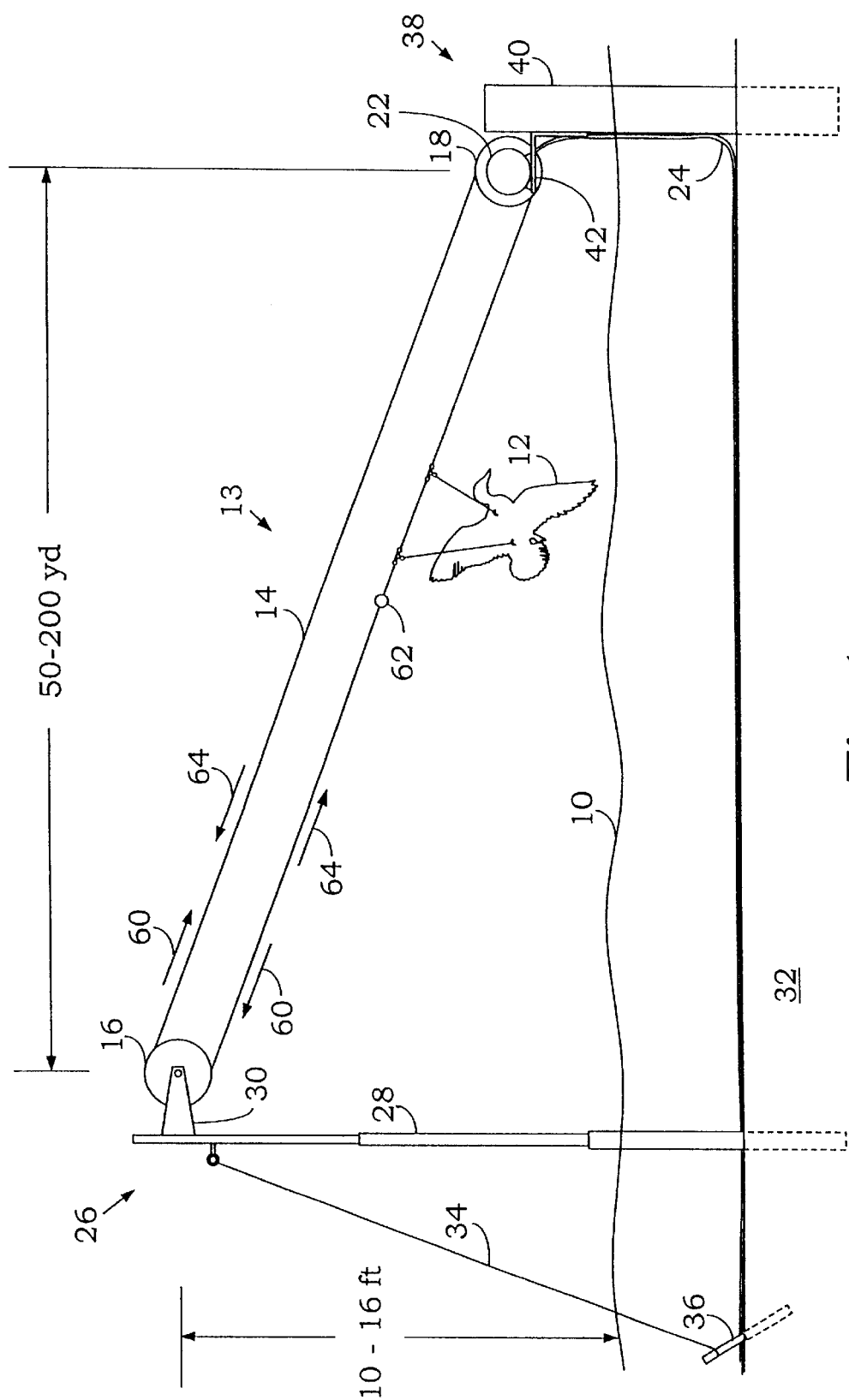
FIG. 1 is a left-side elevation view of a system for simulating the flight of a waterfowl according to a preferred embodiment of the invention.

Shown in FIG. 1 is a system for simulating the flight of a waterfowl as the waterfowl descends and sets down on the surface of a body of water 10. The system includes a waterfowl decoy 12 constructed of buoyant material in a shape that resembles a type of waterfowl. The decoy 12 is attached to an elongate member 13, such as a loop of flexible line 14. Preferably, the line 14 is polypropylene fishing line rated to about 80 LB tensile strength. The loop of line 14 is formed into an oval having a first end looped over a first rotational support structure and a second end looped over a second rotational support structure. Preferably, the first rotational support structure is a pulley 16, and the second rotational support structure is a capstan 18. Tension in the loop 14 is adjusted by making the length of the loop 14 between the first and second ends somewhat less than the distance between the pulley 16 and the capstan 18. Since the loop of line 14 is preferably made of polypropylene, it may be stretched somewhat as it is looped over the pulley 16 and the capstan 18 to create the necessary tension. In the preferred embodiment, the diameters of the pulley 16 and the capstan 18 are approximately six to eight inches.

Figure 2:
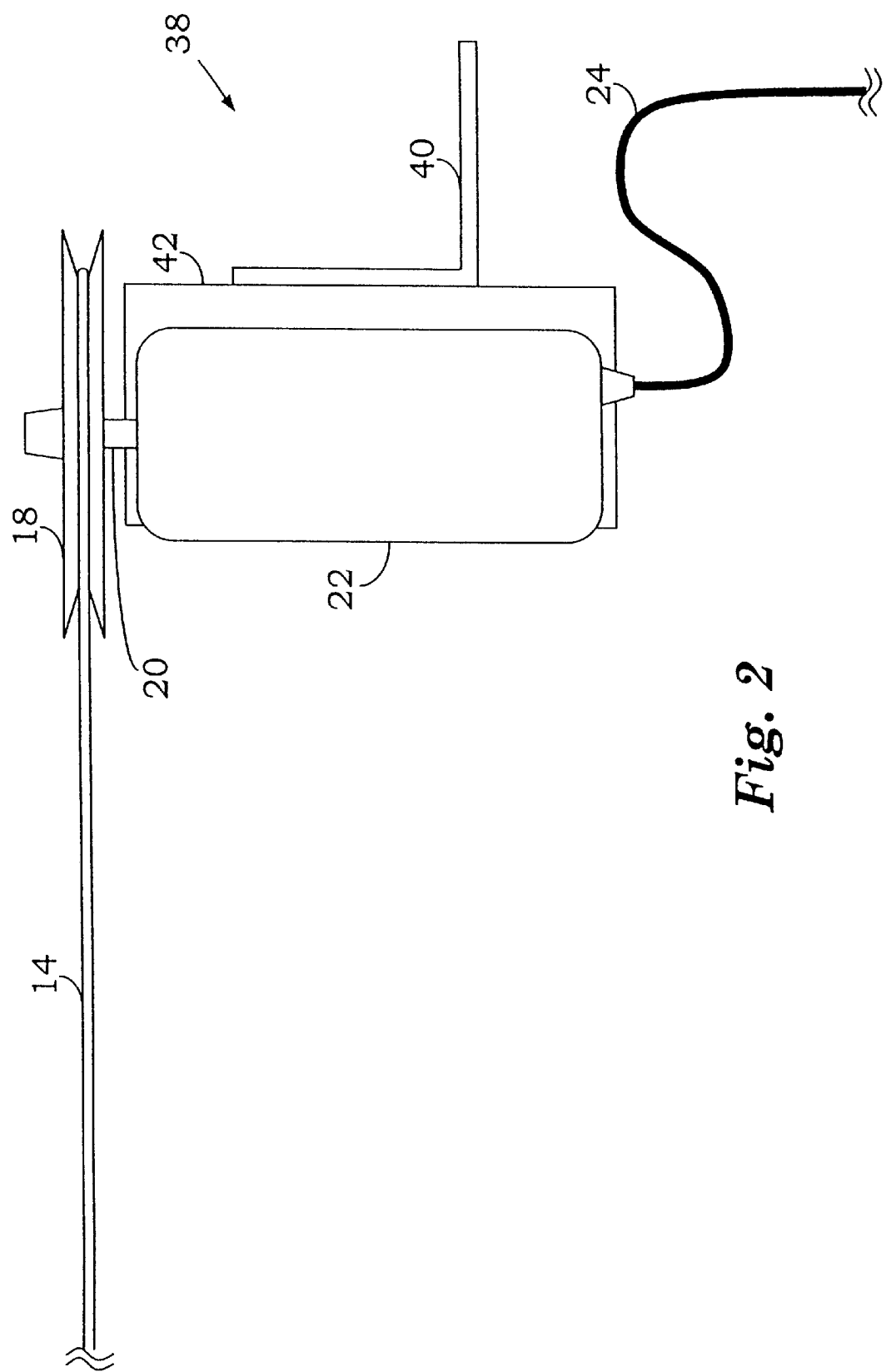
FIG. 2 is a top view of a portion of the system of FIG. 1.

As shown in FIG. 2, the capstan 18 is attached to a drive shaft 20 of an electric motor 22. When the motor 22 is supplied with electrical power through a cable 24, the motor 22 produces torque on the drive shaft 20. In response to the torque, the drive shaft 20 and the attached capstan 18 rotate. The direction and speed of rotation is dependent on characteristics of the electrical power supplied by the cable 24.

Since the loop of line 14 is held in tension between the pulley 16 and the capstan 18, a frictional force exists between the line 14 and the capstan 18. Due to the friction between the line 14 and the capstan 18, as the capstan 18 rotates in response to the torque provided by the motor 22, the capstan 18 provides a tangential pulling force on the line 14. Thus, as the capstan 18 rotates, the loop of line 14 rotates in a tangential direction about the capstan 18 and the pulley 16. As the loop of line 14 rotates, the attached decoy 12 moves between the first and second positions.

The optimum horizontal separation distance between the pulley 16 and the capstan 18 depends on the geometry of the particular body of water in which the system is used. Preferably, the horizontal separation distance is between about 50 and 200 yards.

The pulley 16 is disposed at a first elevation which is well above the surface of the water 10, such as 10 to 16 feet. The pulley 16 is maintained at the first elevation by a pulley elevating structure 26, such as a pole 28 and a pulley bracket 30. In a preferred embodiment, the pole 28 is telescopic so that it may be raised and lowered. As shown in FIG. 1, lower end of the pole 28 is embedded in earth 32 to a depth which is sufficient to firmly hold the pole 28 in a substantially vertical position. To maintain sufficient tension on the loop 14, the pole 28 is braced by guy wires 34 which are anchored to stakes 36. In an alternative embodiment, the pulley bracket 30 and pulley 16 are mounted to a sturdy tree disposed in or near the body of water.

In the preferred embodiment of the invention, the motor 22 is disposed at a second elevation which is from about one to about two feet above the surface of the water 10. As shown in FIGS. 1 and 2, the motor 22 is maintained at the second elevation by motor elevating means 38, such as an anchor post 40 and a motor bracket 42. Preferably, the anchor post 40 is a section of angle-iron which is embedded in the earth 32 to a depth sufficient to firmly maintain it in a substantially vertical position. The motor bracket 42 is preferably another section of angle-iron which is welded or bolted to the anchor post 40. The preferred dimensions of both sections of angle-iron are about three-by-three inches wide and about 0.25 inch thick. The motor 22 is secured to the bracket 42 by straps or bolts.

Preferably, the decoy 12 is shaped to simulate the "cupped" wing posture that a waterfowl exhibits when gliding in to set down on the water. The wing material on the decoy 12 may be somewhat flexible so that air resistance will cause the wings to move in a realistic fashion as the decoy 12 descends.

Figure 3:
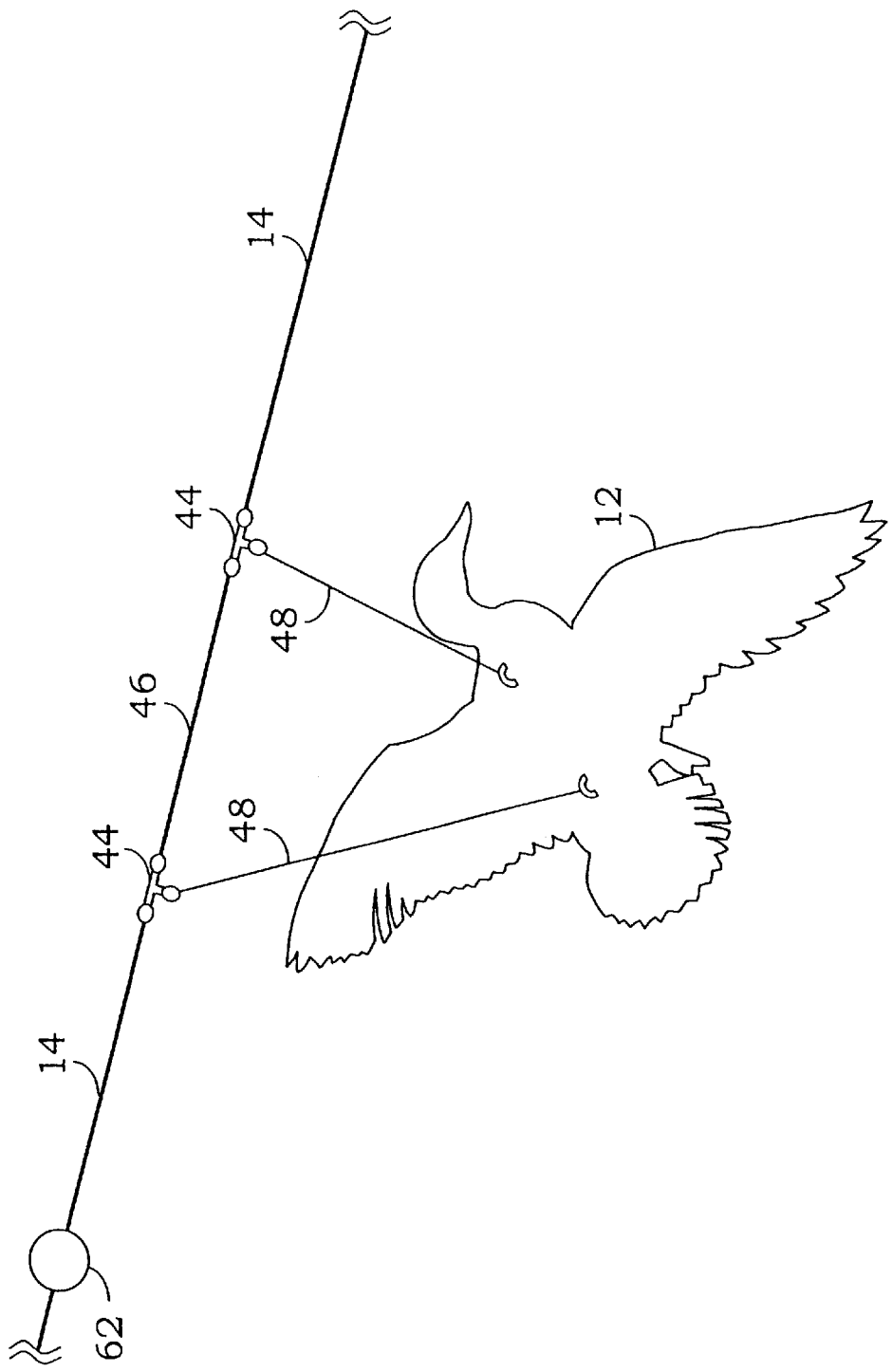
FIG. 3 is an enlarged view of a portion of the system of FIG. 1.

FIG. 3 depicts a preferred structure for suspending the decoy 12 from the loop of line 14. Each end of the line that forms the loop 14 is tied to one of a pair of three-way swivels 44. A short section of line 46 is tied between the two swivels 44, thereby completing the loop 14. A pair of leader lines 48 are tied at one end to the swivels 44 and at the other end to attachment points provided on the decoy 12. Preferably, the leader lines 48 are made of the same type of polypropylene line as is the loop 14. Alternatively, since the leader lines 48 experience less pulling force than does the loop 14, the leader lines 48 may be made of a lower tensile strength line. The length of each of the leader lines 48 may be appropriately adjusted to position the decoy 12 in a realistic posture. The three-way swivels 44 allow the leader lines 48, the decoy 12, and the loop 14 to move independently of each other. This design serves to avoid twisting and tangling of the leader lines 48 during operation of the decoy system.

Figure 4:
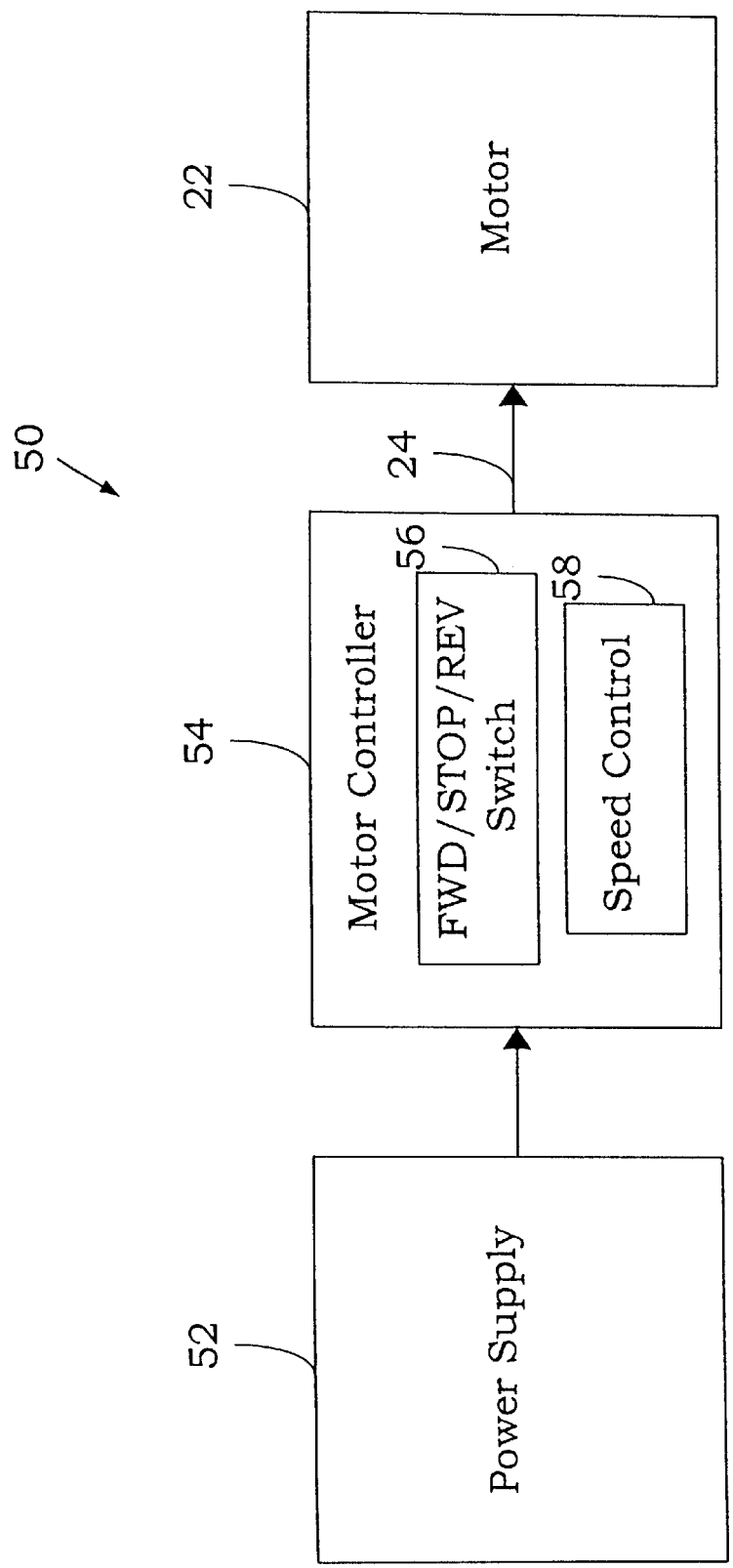
FIG. 4 is a functional block diagram of an electrical control system according to a preferred embodiment of the invention.

Shown in FIG. 4 is a functional block diagram of the preferred embodiment of an electrical system 50 for powering and controlling the motor 22. A power supply 52, such as a 12 volt battery, provides power to a motor controller 54. The motor controller 54 includes a forward/stop/reverse switch 56 and a speed control 58, such as a variable potentiometer. Preferably, the power supply 52 and the motor controller 54 are located in a relatively dry area in the duck blind. The motor controller 54 is connected to the motor 22 by the cable 24.

Prior to using the system to simulate a flying waterfowl, the decoy 12 is first positioned in an initial or start-of-flight position adjacent the pulley 16. To set the decoy 12 to the start-of-flight position, an operator in the duck blind applies power to the motor 22 by setting the switch 56 on the controller 54 to reverse. Preferably, when the switch 56 is set to reverse, the motor 22 causes the capstan 18, and thus the loop 14, to rotate in a clockwise direction as seen from the view of FIG. 1. As the capstan 18 rotates clockwise, the loop 14 rotates in a first tangential direction as indicated by the arrows 60. This rotation of the loop 14 moves the decoy 12 toward the start-of-flight position.

As shown in FIG. 1, a stopper 62, such as wooden ball, is securely attached to the loop 14 approximately 10–12 inches behind the decoy 12. As the decoy 12 moves toward the start-of-flight position, the stopper 62 contacts the pulley 16 and stops the loop 14 from further rotation in the first direction. This prevents the leader lines 48 from becoming tangled in the pulley 16. When the operator observes that the decoy 12 has reached the start-of-flight position, the operator sets the switch 56 to a neutral or off position.

To cause the decoy 12 to descend from the start-of-flight position to an end-of-flight position on the surface of the body of water 10, the operator sets the switch 56 on the controller 54 to forward. Preferably, when the switch 56 is set to forward, the motor 22 causes the capstan 18, and thus the loop 14, to rotate in a counter-clockwise direction as seen from the view of FIG. 1. As the capstan 18 rotates counter-clockwise, the loop 14 rotates in a second tangential direction as indicated by the arrows 64. This rotation of the loop 14 moves the decoy 12 from the start-of-flight position toward the end-of-flight position. Using the speed control 58, the operator may adjust the speed of the descending decoy 12 to simulate the speed of a descending waterfowl. When the decoy 12 has reached the end-off-light position, the operator again sets the switch 56 to the neutral or off position.

When the decoy 12 reaches the end-of-flight position, the decoy 12 contacts the surface of the water 10, thereby causing a splash. This gliding and splashing motion, especially when observed from the vantage point of an approaching waterfowl, creates a visual effect quite similar to that created by an actual lighting waterfowl. Typically, the downward motion of the decoy 12 is initiated at a time when approaching waterfowl will notice it. The decoy 12 is preferably reset to the start-of-flight position at a time when the reverse motion will not be noticed by approaching waterfowl.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. An apparatus for simulating a waterfowl in flight, comprising:
   a pulley disposed at a first position having a first elevation relative to a surface of a body of water;
   a motor disposed at a second position having a second elevation relative to the surface of the body of water, the first and second positions being spaced apart by a horizontal separation distance, the motor having a drive shaft operable to rotate in response to torque produced by the motor;
   a capstan attached to the drive shaft of the motor for rotating in response to the rotation of the drive shaft;

a loop of flexible line formed into an oval having first and second ends, the first end looped over the pulley and the second end looped over the capstan, the loop being held in tension between the pulley and the capstan;

a motor controller disposed remotely from the motor for controlling operation of the motor from remote location; and a waterfowl decoy attached to the flexible line, the decay comprising buoyant material shaped to resemble a type of waterfowl.

2. An apparatus for moving a waterfowl decoy from a first position elevated above a surface of a body of water to a second position adjacent the surface of the body of water under control of an operator in a blind, the first position and the blind being horizontally separated from the second position by portions of the body of water, the apparatus comprising:

a pulley disposed at the first position;

a motor disposed at the second position having a drive shaft operable to rotate in response to torque produced by the motor;

a capstan attached to the drive shaft of the motor for rotating in response to the rotation of the drive shaft;

a continuous loop of flexible line looped around the pulley and the capstan, and held in tension there between;

a motor controller disposed at the blind for controlling operation of the motor;

a motor controller cable for electrically connecting the motor to the motor controller, the cable of sufficient length to span a portion of the body of water separating the blind from the second position, and;

a power supply for providing electrical power to the motor through the motor controller cable under control of the motor controller; and a waterfowl decoy attached to the continuous loop of flexible line, whereby motion of the loop of line imparts corresponding motion to the waterfowl decoy attached thereto, the decoy comprising buoyant material shaped to resemble a type of waterfowl, where rotation of the capstan imparts a tangential pulling force upon the loop of line to cause the loop of line to rotate about the pulley and capstan, thereby moving the decoy between the first and second positions.

3. The apparatus of claim 2 further comprising at least one leader line having one end firmly attached to the loop of line and another end firmly attached to the waterfowl decoy.

4. The apparatus of claim 3 wherein the loop of line includes at least one swivel, the leader line being attached at the one end to the swivel and at the other end to the waterfowl decoy.

5. The apparatus of claim 3 further comprising a stopper attached to the loop of line, the stopper operable to contact the pulley and stop the loop of line from further rotation as the decoy approaches a start-of-flight position adjacent the first position, thereby preventing the leader line from becoming tangled in the pulley.

6. The apparatus of claim 2 further comprising:

the loop of line including two three-way swivels separated by a section of line; and two leader lines, each attached at one end to a corresponding one of the three-way swivels and at another end to the waterfowl decoy, whereby motion of the loop of line imparts corresponding motion to the leader lines and to the waterfowl decoy attached thereto.

7. The apparatus of claim 2 wherein the motor controller further comprises:

a switch for controlling direction of rotation of the motor; and a speed control for controlling speed of the motor.

8. An apparatus for moving a waterfowl decoy from a first position elevated above a surface of a body of water to a second position adjacent the surface of the body of water under control of an operator in a blind, the first position and the blind being horizontally separated from the second position by portions of the body of water, the apparatus comprising:

a pulley disposed at the first position;

a motor disposed at the second position having a drive shaft operable to rotate in response to torque produced by the motor;

a capstan attached to the drive shaft of the motor for rotating in response to the rotation of the drive shaft;

a continuous loop of flexible line looped around the pulley and the capstan, and held in tension there between, the loop of line including two three-way swivels separated by a section of line;

a waterfowl decoy comprising buoyant material shaped to resemble a type of waterfowl;

two leader lines, each attached at one end to a corresponding one of the three-way swivels and at another end to the waterfowl decoy, whereby motion of the loop of line imparts corresponding motion to the leader lines and to the waterfowl decoy attached thereto;

a stopper attached to the loop of line, the stopper operable to contact the pulley and stop the loop of line from further rotation as the decoy approaches the first position, thereby preventing the leader lines from becoming tangled in the pulley;

a motor controller disposed at the blind for controlling operation of the motor, the motor controller including:
a switch for controlling direction of rotation of the motor; and
a speed control for controlling speed of the motor;

a motor controller cable for electrically connecting the motor to the motor controller, the motor controller cable of sufficient length to span a portion of the body of water separating the blind from the second position; and a power supply for providing electrical power to the motor through the motor controller cable under control of the motor controller.

* * * * *